No. 895,437. PATENTED AUG. 11, 1908.
L. CRISE.
TIRE PROTECTOR.
APPLICATION FILED NOV. 15, 1906.

Witnesses
J. Howard Bishop.
B. G. Intu.

Louis Crise, Inventor.
By
Attorney

UNITED STATES PATENT OFFICE.

LOUIS CRISE, OF UPPER SANDUSKY, OHIO, ASSIGNOR OF ONE-HALF TO CHARLES F. CLOSE, OF UPPER SANDUSKY, OHIO.

TIRE-PROTECTOR.

No. 895,437. Specification of Letters Patent. Patented Aug. 11, 1908.

Application filed November 15, 1906. Serial No. 343,616.

*To all whom it may concern:*

Be it known that I, LOUIS CRISE, a citizen of the United States, residing at Upper Sandusky, in the county of Wyandot and State of Ohio, have invented a new and useful Tire-Protector, of which the following is a specification.

This invention relates to tires for vehicles, and more particularly to means for preventing the puncturing of pneumatic tires.

The primary object is to provide a novel and simple structure that can be associated with practically any well known form of tire, will permit the yielding action thereof, and will protect it against cuts, punctures and the like.

The preferred embodiment of the invention is illustrated in the accompanying drawings, wherein:—

Figure 1:
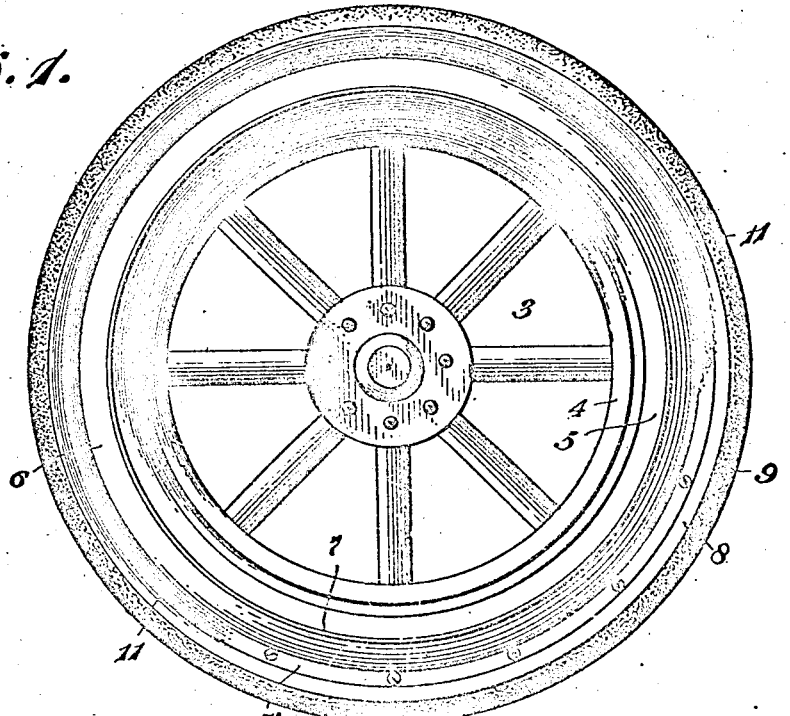
Figure 2:
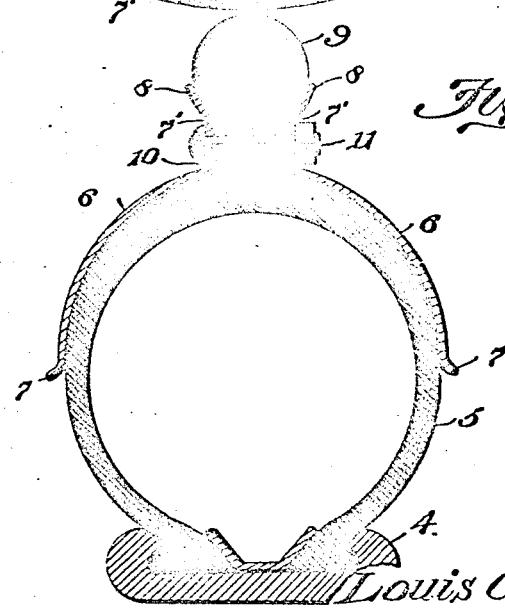

Figure 1 is a side elevation of a wheel, showing the tire equipped with the improved means. Fig. 2 is a cross sectional view on an enlarged scale therethrough.

Similar reference numerals designate corresponding parts in all the figures of the drawings.

In the embodiment illustrated, the wheel 3 is provided with a felly or rim 4, and secured to said rim, is a suitable pneumatic tire body 5, which may be of any well known or desired construction. A metallic casing is employed comprising sections 6 that are oppositely flared and embrace the outer portion of the tire 5. Their inner edges 7 terminate short of the felly 4 so as to permit the necessary expansion and compression of the tire body. These sections 6 furthermore are provided with spaced outstanding flanges 7', the outer margins of which are oppositely flared, as shown at 8. A tread element 9 is employed that has an outer enlarged portion located outside the flanges, and has its inner portion interposed between the flared margins 8 thereof, the said tread element furthermore having a narrow portion 10 that fits between the flanges and bears against the outer side of the tire body 5. Fasteners, in the form of bolts 11 or other suitable devices, pass through the flanges 7' and through the narrower portion 10 of the tread element that is located between said flanges. The tread element is formed of rubber or other suitable yielding material.

It will be evident that this structure is readily applicable to a tire, and when in place thereon, is secured against accidental detachment, constituting a protecting shoe that will prevent cuts and punctures to the tire body. At the same time, the spacing of the casing from the felly permits the necessary compression and expansion of the tire body, as will be evident.

From the foregoing, it is thought that the construction, operation, and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In a tire, the combination with a wheel rim, of a pneumatic tube open at its inner side only and having the said inner side secured to the wheel rim, clamping plates fitted against the outer portion of the tube and partially encircling the same, said plates having outstanding flanges, a solid cushion of yielding material fitted between the plates and bearing against the outer side of the tube, said cushion projecting beyond the flanges, and means for connecting the plates together and clamping the cushion between them, said plates and cushion being removable from the tube without affecting the engagement of the latter with the rim.

2. In a tire, the combination with a wheel rim and a body tube located thereon, of a metallic casing comprising sections located on opposite sides of and bearing against the outer face of the body tube, said sections terminating short of its inner side and short of the wheel rim, said sections having outstanding flanges outside the body tube, a yielding tread element having an enlarged portion outside the flanges, and a narrower portion interposed between the flanges, said narrower portion being separate from, but bearing against the outer face of the body tube, and fastening devices for the sections and
5 tread element passing through the flanges and the narrower portion of the tread element that is located between them.

In testimony, that I claim the foregoing as my own, I have hereto affixed my signature in the presence of two witnesses.

LOUIS CRISE.

Witnesses:
   C. D. HARE,
   F. W. PETERS.